(No Model.)

J. H. SEWALL.
STEAM TRAP.

No. 363,552. Patented May 24, 1887.

Witnesses.
John F. C. Prinkert
Fred L. Emery.

Inventor:
James H. Sewall,
by Crosby & Gregory attys.

UNITED STATES PATENT OFFICE.

JAMES H. SEWALL, OF PORTLAND, MAINE, ASSIGNOR TO THE SEWALL SAFETY CAR HEATING COMPANY, OF SAME PLACE.

STEAM-TRAP.

SPECIFICATION forming part of Letters Patent No. 363,552, dated May 24, 1887.

Application filed September 14, 1886. Serial No. 213,515. (No model.)

*To all whom it may concern:*

Be it known that I, JAMES H. SEWALL, of Portland, county of Cumberland, and State of Maine, have invented an Improvement in Steam-Traps, of which the following description, in connection with the accompanying drawings, is a specification, like letters on the drawings representing like parts.

This invention has for its object to improve that class of steam-traps employing thermostatic devices for controlling the discharge of water of condensation.

The invention consists of a shell or case having suitable inlet and outlet passages, through which the water of condensation and steam pass, and a thermostatic device sensitive to variations in temperature contained within the said shell or case, combined with a sliding piston for opening and closing the inlet-passages, and means, substantially as will be described, operated positively by the thermostatic device for moving the piston back and forth.

My improved trap consists, essentially, of a shell having at one end a removable head-piece, which at its inner side supports a frame, provided with a cylindrical opening for the reception of a piston connected to a lever pivoted upon a projection at the inner end of the said frame, the said lever being actuated more or less by a thermostatic device consisting, as herein shown, of a sealed vessel supported within the frame, one part of the said vessel being jointed to the said lever and operating to move the piston, as will be described.

Figure 1:
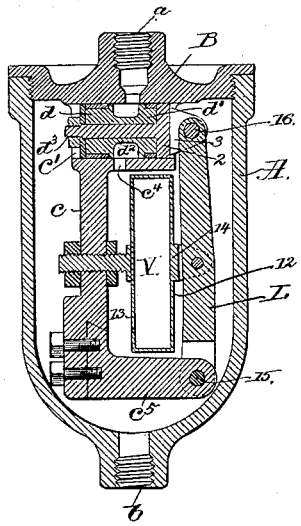
Figure 2:
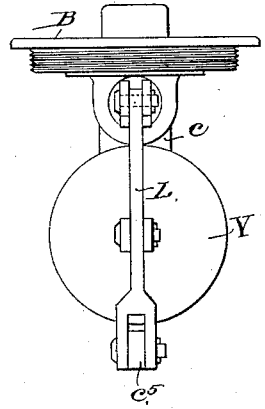
Figure 3:
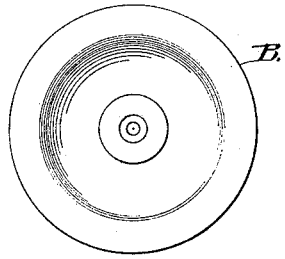

Figure 1 shows in vertical section a steam-trap embodying this invention; Fig. 2, a side elevation of the head-piece and the operating parts of the steam-trap attached thereto removed from the shell or case, and Fig. 3 a top view of the steam-trap.

The main shell or case A of the trap receives in one end of it the head-piece B, the said parts being screwed together. The head-piece is provided with an inlet, $a$, and the shell with an outlet-passage, $b$, for the admission and discharge of water of condensation and steam. The head-piece has secured to its inner side a frame, $c$, which enters the shell or case, the said frame near the head-piece being provided with a cylindrical opening or chamber, $c'$, into which is placed and in which slides a piston.

The inlet-passage $a$ communicates with the valve-chamber $c'$.

The piston, as herein shown, is composed of two disks, $d\ d'$, joined together by a tubular stem, $d^2$, a rod, $d^3$, having a head, 2, being passed longitudinally through the piston and a cap at one end thereof, the said rod being retained in the piston and holding the cap in place by a nut screwed upon one end thereof. (See Fig. 1.) The head 2 has ears 3. The opening or chamber $c'$, at a point between the two disks of the piston, is provided with an outlet or discharge passage, $c^4$, so that water of condensation and steam passing through the inlet-passage $a$ and around the stem $d^2$ of the piston is discharged through the outlet $c^4$ when the piston is in its rearward position, as shown in Fig. 1.

The thermostatic device, herein shown as a sealed vessel, V, secured to the frame $c$ below the chambered portion $c'$, and filled with any suitable expansive material, has at its expansible face an ear or projection, 14.

The lower end of the frame $c$ is provided with an arm, $c^5$, secured thereto, to the end of which, at 15, is pivoted the outer operating-lever, L, which, extended vertically, is connected to the ear 14, and so as to be actuated by the thermostatic device, the upper end of the said operating-lever being loosely connected with the piston by a pin, 16, passing through the end of the said operating-lever L and the ear 3.

When the temperature is sufficiently low, the thermostatic vessel is collapsed, as shown in Fig. 1, leaving the piston to allow water of condensation and steam to be discharged freely; but when steam enters the shell or case the vessel V is expanded to move the operating-lever L, and with it the piston, until the disk $d$ thereof closes the discharge passage or orifice $c^4$, thus cutting off the steam as well as the water of condensation. The steam being thus cut off, the thermostatic device gradually collapses until the disk $d'$ opens the discharge port or orifice $c^4$ and allows the passage of water of condensation and steam.

The steam-trap herein shown is especially applicable for automatically-emptying reservoirs or steam-pipes employed in heating cars, in which case a thermostatic device delicately sensitive to variations in the temperature is not required, but one which will have sufficient power to move the piston, and thus empty the reservoir before water contained therein shall freeze.

I claim—

1. In a steam-trap, the shell or case having suitable inlets and outlets, the frame $c$, placed within the shell or case, said frame having an opening at its upper end which communicates with the inlet, and also with the interior of the shell or case, combined with a piston moving in the said opening at the upper end of the frame $c$, the lever for moving said piston, and the thermostatic device, sensitive to changes in the temperature, for moving the lever to close the inlet during high temperatures only, substantially as described.

2. In a steam-trap, the shell or case having a suitable inlet and outlet passage, the frame $c$, placed within the shell or case, said frame having an opening at its upper end in communication both with the inlet and also with the interior of the shell or case, as at $c^4$, combined with a piston moving in said opening, a lever for moving the piston, and a thermostatic device sensitive to changes in the temperature, located adjacent to the inlet-passage $c^4$, for moving the lever, whereby the said piston may be moved to open the inlet in low temperature and to close the inlet in high temperature, substantially as described.

3. In a steam-trap, the shell or case composed of the shell A and cover B, having a suitable inlet and outlet, combined with the frame $c$, the piston moving in an opening in said frame, and a lever for moving the piston, and a thermostatic device for moving the lever, all supported by the cover B, so that the device may be readily put together and taken apart, all substantially as described.

In testimony whereof I have signed my name to this specification in the presence of two subscribing witnesses.

JAMES H. SEWALL.

Witnesses:
DANIEL D. SEWALL,
CHAS. B. STROUT.